Figure 1:
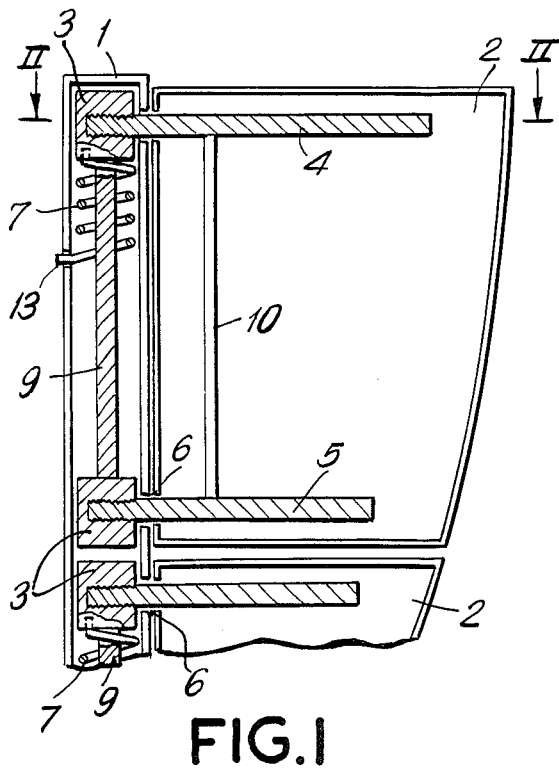

United States Patent [19]

Wildenauer

[11] Patent Number: 4,878,808
[45] Date of Patent: Nov. 7, 1989

[54] AIRFOIL FOR A WIND-DRIVEN WHEEL

[76] Inventor: Anton Wildenauer, Auf dem Wingert 3, 6101 Rossdorf, Austria

[21] Appl. No.: 189,988

[22] Filed: May 4, 1988

[30] Foreign Application Priority Data

May 14, 1987 [AT] Austria .................................. 1223/87

[51] Int. Cl.$^4$ ................................................. F03D 7/04
[52] U.S. Cl. .............................. 416/132 B; 416/136 R
[58] Field of Search .................. 416/11, 132 B, 136 R

[56] References Cited

U.S. PATENT DOCUMENTS

| 13,244 | 7/1855 | Elgar | 416/132 B |
| 16,943 | 3/1857 | Wilson et al. | 416/136 R |
| 867,990 | 10/1907 | Miles . | |
| 2,302,054 | 11/1942 | Putt | 416/132 B |
| 3,395,761 | 8/1968 | Holzer | 416/136 R |
| 3,874,816 | 4/1975 | Sweeney et al. | 416/132 B |
| 4,619,585 | 10/1986 | Storm | 416/132 B |

FOREIGN PATENT DOCUMENTS

| 99817 | 4/1925 | Austria . | |
| 2949057 | 6/1981 | Fed. Rep. of Germany | 416/132 B |
| 3143686 | 5/1983 | Fed. Rep. of Germany . | |
| 3219930 | 12/1983 | Fed. Rep. of Germany . | |
| 906427 | 1/1946 | France | 416/136 R |
| 2288877 | 5/1976 | France | 416/132 B |
| 135273 | 8/1982 | Japan | 416/132 B |
| 630287 | 10/1961 | Switzerland | 416/136 R |
| 7745 | 3/1909 | United Kingdom | 416/132 B |

Primary Examiner—Everette A. Powell, Jr.
Attorney, Agent, or Firm—Toren, McGeady & Associates

[57] ABSTRACT

An airfoil of a wind-driven wheel consists of a spar and several vanes pivotable independently of each other, the spar and the airfoil being located next to each other in a form-locked manner so as to form a streamlined airfoil section, pivot bearings and return springs of the vanes are provided inside the spar, a web passes through an aperture in the side wall of the spar and connects the vane to the pivot bearing, the vane being swivelable in the direction of excessively strong wind pressure so as to stress a return spring, the web remote from the hub and the region of the vane is removed from the hub has a larger angle of incidence with respect to the direction of the wind than the web nearer to the hub and the region of the airfoil nearer to the hub, the spar being rotatable in a spar root so that angle of incidence can be varied, the pivot bearings which are in connection with the same vane are connected by a crossbar, stress in the return spring can be adjusted by a retention and cover strip covers the gap between two airfoils while a support frame increases the rigidity or the strength of the vane.

9 Claims, 1 Drawing Sheet

U.S. Patent    Nov. 7, 1989    4,878,808

AIRFOIL FOR A WIND-DRIVEN WHEEL

The invention is directed to the airfoil of a wind-driven wheel for utilization of wind energy, as it is for instance used for generation of electric current or the operation of water pumps and other appliances. The airfoil of a wind-driven wheel is preferably used on slow running wind-driven wheels with an approximately horizontal axis of rotation. A plurality of such wind-driven airfoils is in most cases attached at each winddriven wheel.

Wind-driven wheels, whose airfoils are connected with the spar in a pivotable and also flexible manner, are already in existence. In the wind-driven wheel in the FR-PS 906427 each spar has a web r, which is pivotably or swivelably connected with the spar at the spar end which is remote from the hub. The solution is US-PS 867990 is similar. Here also respectively one web 26 is inserted into the spar end of each spar which is remote from the hub. Since each spar has only one spar end which is remote from the hub, each spar can carry only one airfoil in these two patent publications. One single airfoil per spar is however unable to absorb the forces acting at the wind-driven wheel in a sufficiently resilient manner.

The airfoil of a wind-driven wheel in AT-PS 99817 provides a torque rod for the airfoil rotation, which torque rod is located inside the spar. This torque rod is connected to the airfoil also only through the spar end remote from the hub. In a second type of embodiment the torque rod rotates the entire outer spar connected with the airfoil. None of these two types of embodiment permit to attach several airfoils at the same spar to be pivotable or swivelable independently of each other. The same applies also for a wind-driven wheel built according to the DE-OS 3143686. The tube shaft has only one outer aperture for the longitudinal spar and this spar is rigidly connected only with one blade section. A subdivision of the blade section into airfoils pivotable independently of each other is impossible also in this version.

The design of the wind-driven wheel in DE-OS 3219930 is different. In this wind-driven wheel a plurality of airfoils embraces the same spar. This encirclement of the spar by the airfoil- and resilient elements provided for this purpose makes of necessity the connection wider, than is the spar itself. The wider connection provides more unusable resistance than the more slender spar. In addition this encirclement prevents the spar at its entire windward side from being free for the attachment of retention devices.

In none of the known wind-driven wheels it is possible for a spar to carry several airfoils, that these airfoils are supported to be pivotable independently of each other, wherein each airfoil has its pivot bearing and its spring or its pivot bearings and its springs located inside the spar. The present invention avoids the shortcomings of the known types of construction.

This task has been accomplished by a first rate solution in that the spar and airfoil are located next to each other in a positively locking manner. This connection has a common streamlined air foil section. A plurality of airfoils is located on each spar. The pivot bearings of the airfoils and the return springs are located inside the spar. The connection of the airfoils with the pivot bearings occurs through apertures which are located in the sidewall of the spar.

Figure 3:
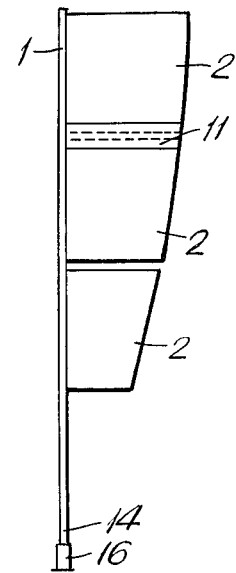
Figure 2:
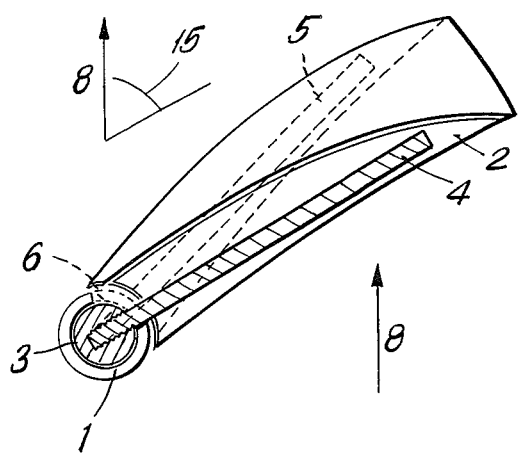
Figure 4:

The invention is described with the help of drawings depicting only one embodiment example. It is shown on:

FIG. 1 a section through a portion of a wind-driven air
  foil through the spar axis, without taking into
  account the various angles of attack;
FIG. 2 the section II—II, perpendicular to the
  longitudinal axis of the spar;
FIG. 3 a more scaled-down plan view upon the entire
  airfoil of the wind-driven wheel;
FIG. 4 a plan view of the spar and airfoil along the
  longitudinal axis of the spar.

The components are arranged and constructed in the following manner:

The spar 1 consists preferably of a steel tube. It is connected at the side of the hub 14 with the axis of the wind-driven wheel. The spar can be economically supported by pull ropes at regions remote from the hub as well as in the central region, particularly at the windward side of the spar 1 and at right angles thereto. Several airfoils 2 are suspended next to each other at the leeward side of the spar 1. Each airfoil is fastened to the spar 1 in a positively locking manner, as is shown in FIG. 4. The airfoils 2 are preferably fabricated from an aluminum sheet or fiber-reinforced plastics material. The airfoils 2 are designed in such a way that airfoil and spar 1 together form a streamlined airfoil section 12. With appropriate selection of the angle of attack 15 against the direction of the wind 8 this airfoil section 12 provides a strong lift force in direction of rotation of the wind-driven wheel with only a slight wind turbulence formation. Each airfoil 2 is preferably suspended at two pivot bearings 3. The pivot bearings 3 are located inside the spar 1. The connection between the airfoil 2 and the pivot bearing 3 is provided by a web 4,5, which passes from the airfoil through an aperture 6 at the longitudinal side of the spar 1 leading to the pivot bearing. The aperture 6 is preferably an oblong drilled hole, which is sufficiently wide to permit a pivoting of the web 4,5 and thus of the airfoil 2 from the angle of incidence up to approximately in the axial direction of the wind-driven wheel. This direction of the axis corresponds in operation to the direction of the wind 8. The angle of incidence 15 is for aerodynamic reasons greater in the portion of the spar 1 which is remote from the hub than in the portion near the hub. Corresponding to this there exists also a greater angle of attack 15 at the web 4 which is further remote from the hub and thus at the region of the airfoil which is further removed from the hub, and a smaller angle of incidence at the web 5 which is nearer to the hub and thus at the region of the airfoil which is nearer to the hub. When viewed along the spar 1, the airfoil 2 lies helically rotated around the spar, similarly to the blade of a ship's propeller. The airfoil 2 is pressed into the incidence towards the direction of the wind 8 by the return spring 7. The return spring 7 is preferably a cylindrical spiral spring of steel, which is located inside the spar. One leg of the return spring 7 is fastened at the retention 13 at the spar 1, the second at the rotatable part of the pivot bearing 3. In case of excessively strong wind pressure upon the airfoil 2, the airfoil rotates in direction of the wind 8 while stressing the return spring 7. The retention 13 of the return spring 7 is adjustable, whereby the preload of the spring can be regulated. The spar 1 is inserted into a spar root 16, so as to be rotatable around its longitudinal axis. By rotating the spar 1 the angle of incidence 15 of all airfoils at the same spar can be changed. Several pivot bearings 3 preferably those which carry the same airfoil 2 are connected with each other by a crossbar 9. This increases the strength and the return springs 7 are partially economized in order to avoid a useless escape flow of the wind through the gap between adjacent airfoils 2 one airfoil is provided with a cover strip 11 for instance of rubber or aluminum sheet. This cover can also overlap the portion of the adjacent airfoil 2, preferably on the windward side. A support frame 10, preferably located inside the airfoil 2 and connected with the web 4,5 provides additional stiffness or ruggedness to the airfoil.

What is claimed is:

1. An airfoil for a wind-driven wheel rotatable about a horizontal axis for utilizing wind energy, comprising:
    a spar connected with the axis of the wheel and having a longitudinal side;
    at least one vane provided at the longitudinal side of the spar;
    at least one pivot bearing located inside the spar;
    a return spring provided so as to press the vane into a neutral position; and
    at least one web provided so as to connect the at least one vane with the at least one pivot bearing, the web being arranged so as to pass through an aperture in the longitudinal side of the spar.

2. An airfoil for a wind-driven wheel according to claim 1, wherein the return spring is arranged inside the spar.

3. An airfoil for a wind-driven wheel according to claim 2, wherein the at least one vane and the spar have surfaces which face and fit into each other so as to form a streamlined airfoil section.

4. An airfoil for a wind-driven wheel according to claim 1, and further comprising a hub arranged so as to connect one end of the spar with the rotational axis of the wind-driven wheel, the at least one web including a first web remote from the hub and a second web nearer to the hub than the first web, the first web and a region of the at least one vane remote from the hub having an angle of incidence with respect to a wind direction which is larger than an angle of incidence of the second web and a region of the vane nearer the hub.

5. An airfoil for a wind-driven wheel according to claim 1, wherein the spar is supported at one end so as to be rotatable about its longitudinal axis.

6. An airfoil for a wind-driven wheel according to claim 1, wherein at least two pivot bearings are provided, and further comprising a cross-bar arranged so as to connect the at least two pivot bearings together.

7. An airfoil for a wind-driven wheel according to claim 1, wherein the return spring has an adjustable retention.

8. An airfoil for a wind-driven wheel according to claim 1, and further comprising a cover strip arranged so as to cover a gap between two adjacent vanes, the cover strip being attached to one of the two adjacent vanes.

9. An airfoil for a wind-driven wheel according to claim 4, and further comprising a support frame provided so as to connect the two webs of the vane.

* * * * *